US006599668B2

(12) United States Patent
Chari et al.

(10) Patent No.: US 6,599,668 B2
(45) Date of Patent: Jul. 29, 2003

(54) PROCESS FOR FORMING COLOR FILTER ARRAY

(75) Inventors: Krishnan Chari, Fairport, NY (US); John C. Kowalczyk, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 165 days.

(21) Appl. No.: 09/923,245

(22) Filed: Aug. 3, 2001

(65) Prior Publication Data

US 2003/0064301 A1 Apr. 3, 2003

(51) Int. Cl.[7] ............................ G02B 5/20; G03C 1/825
(52) U.S. Cl. ............................................ 430/7; 430/511
(58) Field of Search ...................................... 430/7, 511

(56) References Cited

U.S. PATENT DOCUMENTS 1,440,373 A * 1/1923 Camiller et al. ............... 430/7
2,115,886 A * 5/1938 Smith et al. ................... 430/7
2,214,531 A * 9/1940 Killick ....................... 430/511
4,971,869 A 11/1990 Plummer
6,117,627 A 9/2000 Tanaka et al.

FOREIGN PATENT DOCUMENTS

DE 1811 983 6/1970
EP 0 935 168 A2 8/1999

OTHER PUBLICATIONS

M. J. Simons, "Method of Making a Random Color Filter Array", USSN 09/808,844 (D–80552) filed Mar. 15, 2001.

M. J. simons, "Film With Random Color Filter Array", USSN 09/808,873 (D–80554) filed Mar. 15, 2001.

* cited by examiner

*Primary Examiner*—John A. McPherson
(74) *Attorney, Agent, or Firm*—Arthur E. Kluegel

(57) ABSTRACT

Disclosed is process for forming a color filter array layer on a transparent surface, comprising the step of applying a water-borne solid-particle dispersion of randomly disposed colored beads of a water-immiscible synthetic polymer to the surface.

20 Claims, 1 Drawing Sheet

PROCESS FOR FORMING COLOR FILTER ARRAY

CROSS-REFERENCE TO RELATED APPLICATIONS

This application is being cofiled with Ser. No. 09/922,273, related to a random color array film.

1. Field of the Invention

This invention relates to a process for forming a color filter array on a surface wherein colored beads composed of a water-immiscible synthetic polymer or copolymer are coated from a water-borne solid particle dispersion.

2. Background of the Invention

The great majority of color photographs today are taken using chromogenic color film in which color-forming couplers, which may be incorporated in the film or present in the processing solution, form cyan, magenta and yellow dyes by reaction with oxidized developing agent which is formed where silver halide is developed in an imagewise pattern. Such films require a aid development process which is carefully controlled in respect of time and temperature, which is usually followed by a silver bleaching and a fixing step, and the whole process typically takes several minutes and needs complex equipment.

Color photography by exposing a black-and-white photographic emulsion through a color filter array which is an integral part of the film or plate on which the photographic emulsion is coated, has long been known to offer certain advantages of simplicity or convenience in color photography. Thus the Autochrome process, disclosed by the Lumiere brothers in 1906 (U.S. Pat. No. 822,532) exposed the emulsion through a randomly disposed layer of red, green and blue-colored potato starch grains, and the emulsion was reversal processed to give a positive image of the scene which appeared colored when viewed by light transmitted through the plate. The process allowed the formation of a colored photograph without the chemical complexity of later photographic methods.

The Dufaycolor process (initially the Dioptichrome plate, L. Dufay, 1909) used a regular array of red, green and blue dyed patches and lines printed on a gelatin layer in conjunction with a reversal-processed black-and-white emulsion system, which similarly gave a colored image of the scene when viewed by transmitted light.

Polavision (Edwin Land and the Polaroid Corporation, 1977) was a color movie system employing a rapid and convenient reversal processing method on a black-and-white emulsion system coated above an array of red, green and blue stripes, which gave a colored projected image. It was marketed as a still color transparency system called Polachrome in 1983.

These methods suffered a number of disadvantages. The images were best viewed by passing light through the processed film or plate, and the image quality was not sufficient to allow high quality prints to be prepared from them, due to the coarse nature of the Autochrome and Dufaycolor filter arrays, and the coarse nature of the positive silver image in the Polavision and Polacolor systems. The regular array patterns were complicated and expensive to manufacture. In addition, the films which used regular or repeating filter arrays were susceptible to color aliasing when used to photograph scenes with geometrically repeating features.

U.S. Pat. No. 4,971,869 discloses a film with a regular repeating filter array which claims to be less susceptible to aliasing problems. The film comprises a panchromatic photographic emulsion and a repetitive pattern of a unit of adjacent colored cells wherein at least one of the cells is of a subtractive primary color (e.g. yellow, magenta or cyan) or is of a pastel color. Scene information can be extracted from the developed film by opto-electronic scanning methods.

U.S. Pat. No. 6,117,627 discloses a light sensitive material comprising a transparent support having thereon a silver halide emulsion layer and a randomly arranged color filter layer comprising colored resin particles. The material has layer arrangement limitations and results in increased fogging of the sensitized layer. The patent discloses the preparation of a color filter array using heat and pressure to form the color filter layer prior to application of the light sensitive layer to a support. Due to the necessary use of pressure and heat, it is not practical to use the teachings of this patent to prepare a film having a light sensitive layer between the color filter layer and the support. Attempting to apply the needed heat and pressure to bond the filter layer to the rest of the multilayer would damage the light sensitive layer. The patent also discloses exposing, processing and electro-optically scanning the resultant image in such a film and reconstructing the image by digital image processing.

Color photographic films which comprise a color filter array and a single image recording layer or layer pack have the advantage of rapid and convenient photographic processing, as the single image recording layer or layer pack can be processed rapidly without the problem of mismatching different color records if small variations occur in the process. A small change in extent of development for example will affect all color records equally. Exceptionally rapid processing is possible using simple negative black-and-white development, and if suitable developing agents are included in the coating, the photographic response can be remarkably robust or tolerant towards inadvertent variations in processing time or temperature.

It is desirable that the method of manufacturing the filter array be simple and of comparatively low cost. Known methods of making regular filter arrays, such as those known for Dufaycolor or Polachrome films, are complex and costly, involving several sequential applications of materials to the film. Known methods of making random filter arrays, such as those used for Autochrome film and that described in EP 935 168 also involve complex operations, including separating and grading or sizing the colored particles of starch or resin respectively, dispersing them in a coating medium, coating and drying and then calendaring the coated layer to flatten the particles.

A problem to be solved is to provide a process for forming a color filter array on a surface that is simple and cost effective.

SUMMARY OF THE INVENTION

The invention provides a process for forming a color filter array layer on a transparent surface, comprising the step of applying a water-borne solid-particle dispersion of randomly disposed colored beads of a water-immiscible synthetic polymer to the surface.

In the case of digital image capture, devices such as digital cameras and scanners, the method of the invention can provide a low cost means of manufacturing color filter arrays, and the random nature of the array will give reduced color flinging at the edges with fine geometric structures in the scene relative to a regular array.

DETAILED DESCRIPTION OF THE INVENTION

The invention is generally described above. As used herein the following terms are as defined:

"bead" means a solid particle having a substantially curvilinear shape. The particles are not beads if they are fluidic rather than solid at room temperature. Examples of beads are particles having a spheroid or ellipsoid shape. Particles with substantial edges or comers or which have been crushed, powdered or ground are not beads. The beads may comprise a polymer that is inherently colored or may contain a separate colorant.

"insoluble colorant" means a colorant, whether a pigment or a dye, that is not dissolved under either the coating conditions for making the film or the development conditions for processing the film.

"light sensitive layer" means a layer that, upon imagewise exposure to light, undergoes more or less change depending on the amount of light exposure.

"nano-particle" means a particle having an average particle size less than 0.3 microns.

"nano-particulate milled dispersion" means a nano-particle dispersion prepared by milling.

"percentage overlap" means the ratio of (the projected overlapping cross-section of overlapping beads divided by the cross-section of all beads)×100. More accurate imaging and more light sensitivity occurs when a given photon of light is filtered by only one color of bead. A high percentage overlap is therefore an undesirable feature of CFA.

"synthetic polymer" means a polymer prepared from the corresponding monomers by synthetic means as opposed to one occurring in nature, such as gelatin.

"water permeable layer" means a layer that is readily pervious to water.

Figure 1:
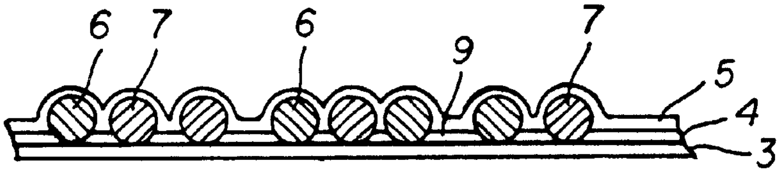
FIG. 1 is a schematic view of the layers of a color filter array of the invention.
Figure 2:
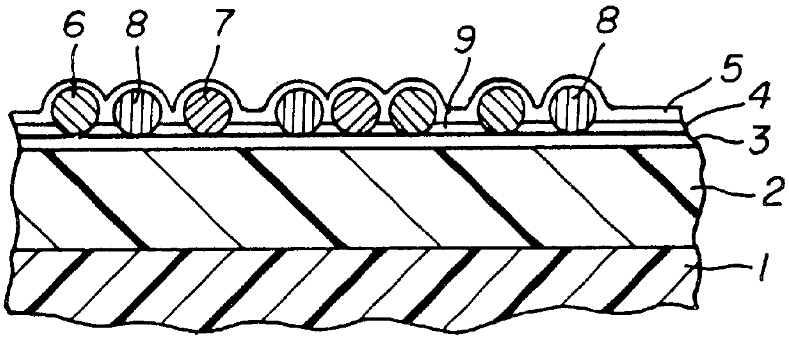
FIG. 2 is a schematic view of the layers of a film employing a color filter array of the invention.
Figure 3:
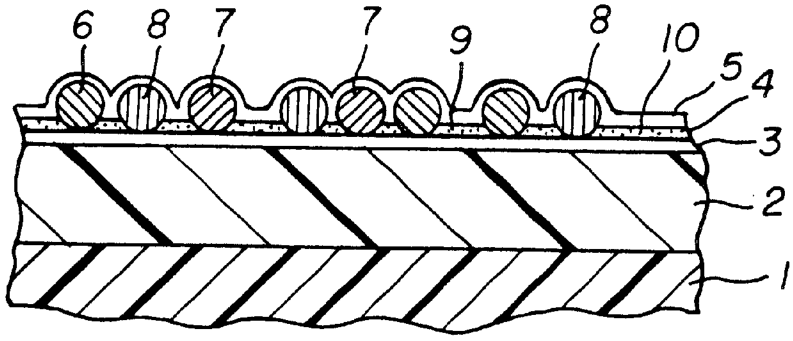
FIG. 3 is a schematic view of the layers of another film employing a color filter array of the invention.

FIG. 1 shows one embodiment of the invention. An array is shown that may be employed to selectively transmit light of a particular color. The array comprises an underlayer 3, color filter array (CFA) layer 4, and a protective overcoat 5, the CFA layer containing transparent beads of a first color 6 and second color 7 disposed in a water permeable continuous phase transparent binder 9. The thicknesses of the layers are not to scale. FIG. 2 shows the use of such an array additionally including third color 8 as part of a multilayer film structure in which the array is combined with support 1 bearing light sensitive layer 2. FIG. 3 shows a multilayer film similar to that of FIG. 2, additionally containing neutral nano-particles 10 dispersed in the continuous phase transparent binder 9.

The beads useful in the invention are solid rather than liquid or fluid in character. They are curvilinear in shape to aid in the formation of a monolayer having a low percentage overlap with color particles of other colors. They may be prepared in any manner suitable for obtaining the desired bead shape. Suitable methods are suspension polymerization methods such as emulsion polymerization and Limited Coalescence as described by Thomas H. Whitesides and David S. Ross in "J. Colloid Interface Science" 169.48–59(1995).

The limited coalescence method includes the "suspension polymerization" technique and the "polymer suspension" technique. A preferred method of preparing polymer particles in accordance with this invention is by a limited coalescence technique where polyaddition polymerizable monomer or monomers are added to an aqueous medium containing a particulate suspending agent to form a discontinuous (oil droplet) phase in a continuous (water) phase. The mixture is subjected to shearing forces, by agitation, homogenization and the like to reduce the size of the droplets. After shearing is stopped, an equilibrium is reached with respect to the size of the droplets as a result of the stabilizing action of the particulate suspending agent in coating the surface of the droplets, and then polymerization is completed to form an aqueous suspension of polymer particles. This process is described in U.S. Pat. Nos. 2,932,629; 5,279,934; and 5,378,577; which are incorporated herein by reference.

In the "polymer suspension" technique, a suitable polymer is dissolved in a solvent and this solution is dispersed as fine water-immiscible liquid droplets in an aqueous solution that contains colloidal silica as a stabilizer. Equilibrium is reached and the size of the droplets is stabilized by the action of the colloidal silica coating the surface of the droplets. The solvent is removed from the droplets by evaporation or other suitable technique resulting in polymeric particles having a uniform coating thereon of colloidal silica. This process is further described in U.S. Pat. No. 4,833,060 issued May 23, 1989, incorporated by reference.

In practicing this invention using the suspension polymerization technique, any suitable monomer or monomers may be employed such as, for example, styrene, vinyl toluene, p-chlorostyrene; vinyl naphthalene; ethylenically unsaturated mono-olefins such as ethylene, propylene, butylene and isobutylene; vinyl halides such as vinyl chloride, vinyl bromide, vinyl fluoride, vinyl acetate, vinyl propionate, vinyl benzoate and vinyl butyrate; esters of alpha-methylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alpha-chloroacrylate, methyl methacrylate, ethyl methacrylate and butyl methacrylate; acrylonitrile, methacrylonitrile, acrylamide, vinyl ethers such as vinyl methyl ether, vinyl isobutyl ether and vinyl ethyl ether; vinyl ketones such as vinyl methylketone, vinyl hexyl ketone and methyl isopropyl ketone; vinylidene halides such as vinylidene chloride and vinylidene chlorofluoride; and N-vinyl compounds such as N-vinyl pyrrole, N-vinyl carbazole, N-vinyl indole and N-vinyl pyrrolidone divinyl benzene, ethylene glycol dimethacrylate, mixtures thereof; and the like.

In the suspension polymerization technique, other addenda are added to the monomer droplets and to the aqueous phase of the mass in order to bring about the desired result including initiators, promoters and the like which are more particularly disclosed in U.S. Pat. Nos. 2,932,629 and 4,148,741, both of which are incorporated herein by reference.

Useful solvents for the polymer suspension process are those that dissolve the polymer, which are immiscible with water and which are readily removed from the polymer droplets such as, for example, chloromethane, dichloromethane, ethylacetate, vinyl chloride, methyl ethyl ketone, trichloromethane, carbon tetrachloride, ethylene chloride, trichloroethane, toluene, xylene, cyclohexanone, 2-nitropropane and the like. A particularly useful solvent is dichloromethane because it is a good solvent for many polymers while at the same time, it is immiscible with water. Further, its volatility is such that it can be readily removed from the discontinuous phase droplets by evaporation.

The quantities of the various ingredients and their relationship to each other in the polymer suspension process can vary over wide ranges, however, it has generally been found that the ratio of the polymer to the solvent should vary in an amount of from about 1 to about 80% by weight of the combined weight of the polymer and the solvent and that the combined weight of the polymer and the solvent should vary with respect to the quantity of water employed in an amount of from about 25 to about 50% by weight. The size and quantity of the colloidal silica stabilizer depends upon the size of the particles of the colloidal silica and also upon the size of the polymer droplet particles desired. Thus, as the size of the polymer/solvent droplets are made smaller by high shear agitation, the quantity of solid colloidal stabilizer is varied to prevent uncontrolled coalescence of the droplets and to achieve uniform size and narrow size distribution of the polymer particles that result. These techniques provide particles having a predetermined average diameter anywhere within the range of from 0.5 micrometer to about 150 micrometers with a very narrow size distribution. The coefficient of variation (ratio of the standard deviation to the average diameter, as described in U.S. Pat. No. 2,932,629) is normally in the range of about 15 to 35%.

The particular polymer employed to make the beads is a water immiscible synthetic polymer that may be colored. The preferred polymer is any amorphous water immiscible synthetic polymer. Examples of polymer types that are useful are polystyrene, poly(methyl methacrylate) or poly (butyl acrylate). Copolymers such as a copolymer of styrene and butyl acrylate may also be used. Polystyrene polymers are conveniently used. The formed beads are colored using an insoluble colorant that is a pigment or dye that is not dissolved under either the coating conditions or the development processing conditions. Suitable dyes may be oil-soluble in nature, and can be chosen for example from the classes of solvent dyes and disperse dyes listed in the Color Index, 3rd Edition, published by The Society of Dyers and Colorists, Bradford, England. Specific examples are listed under their Color Index (CI) names, and include CI Solvent Blue 14, CI Solvent Blue 35, CI Solvent Blue 63, CI Solvent Blue 79, CI Solvent Yellow 174, CI Solvent Orange 1, CI Solvent Red 19, CI Solvent Red 24, CI Disperse Yellow 3, and 4-phenylazodiphenylamine.

Suitable pigments are chosen for their properties of hue, fastness, and colorability, and can include, for example, CI Pigment Green 7, CI Pigment Green 36, CI Pigment Blue 15:3, CI Pigment Blue 60, CI Pigment Violet 23, CI Pigment Red 122, CI Pigment Red 177, CI Pigment Red 194, CI Pigment Orange 36, CI Pigment Orange 43, CI Pigment Yellow 74, CI Pigment Yellow 93, CI Pigment Yellow 110, and CI Pigment Yellow 139. When pigment particles are incorporated in the colored elements, they should be of a fine particle size, preferably substantially less than one micrometer.

After the beads are colored, they are then randomly mixed with other beads similarly prepared but dyed a different color. The beads are desirably formed so as to have an equivalent circular diameter, when projected in a direction perpendicular to the support, of 3–15 micrometers.

The beads are conveniently dispersed in a random manner into a continuous transparent binder. The binder is any water permeable material that will permit water to pass through the layer in the development-processing phase of the imaging. Examples of suitable water permeable binders include gelatin, poly(vinyl alcohol), poly(vinyl pyrrolidone), poly (ethylene oxide), polyacrylamide, polymers based on acrylic acid or maleic acid units, and water soluble cellulose derivatives such as hydroxyethyl cellulose. Gelatin is a readily convenient source for the water permeable binder Improved quality reproductions are obtained when the binder contains an additional neutral colored particle. Such particles may range from white to black and are desirable of a mean size smaller than the beads so as to enable the particles to fill voids between the beads. Nano-particles having an average particle size in the range of 0.01 to 0.3 microns are useful for this purpose. Carbon black is one suitable composition for this nano-particle.

The beads may contain a cross-linking agent but this component will desirably not exceed 30 wt % of the total polymer content. The beads will typically be composed of beads of two or more colors. Three or more colors provide better color rendition in general. An additive or subtractive primary system may serve as the basis for the bead colors. Thus, either red/green/blue or cyan/magenta/yellow systems may be readily used. It may be desirable to provide an undercoat for the CPA layer to help control the extent of monolayer coating of the beads. It is further desirable to provide an overcoat over the CFA layer for protective purposes.

Passage of processing solutions and chemicals through the CPA layer is especially important in the preferred film structure in which the CFA is located between the emulsion layers and the top coated surface of the film, that is between the emulsion layers and the processing solutions which are applied to the film, see FIGS. 1–3. This film structure is preferred because it allows the film to be exposed in the camera with the support towards the back of the camera and the emulsion side toward the lens, which is the orientation for which films and cameras are normally designed. Such a film structure is essential in the case of Advanced Photographic System films because the magnetic recording layer functions most effectively when coated on the back of the support and has to be in contact with the magnetic heads in the back of the camera.

The light sensitive layer(s) 2 may comprise one or more layers. The layer(s) are sensitive to light that has passed through each or all of the different color elements of the layer 3. Thus the image information for each color record is recorded in the emulsion layer unit. The emulsions may be of different speeds. Photographic addenda known in the art, such as antifoggants and speed-increasing agents may be present in or adjacent to the layer(s) 3. Substances such as developing agents, blocked developing agents, color couplers and other materials which take part in the processing step may be in or adjacent to the emulsion layer(s) 3. Developing agents suitable for including in the coating, and a preferred way of incorporating them, are disclosed in U.S. Pat. No. 5,804,359.

The light sensitive layer is desirably one based on a silver halide emulsion of the type common in the art. The particular type of emulsion and development processing employed is not critical so any of the emulsion types and development processes available may be used. The emulsion is panchromatically sensitized so that it is sensitive to any color light that is transmitted by the nearby filter beads. The image is suitably formed by the developed silver using either a negative or reversal process.

The black-and-white photographic silver halide elements useful in the present invention are generally composed of a conventional flexible, transparent film support (polyester, cellulose acetate or polycarbonate) that has applied to each side one or more photographic silver halide emulsion layers. For some uses, it is conventional to use blue-tinted support materials to contribute to the blue-black image tone sought in fully processed films. Polyethylene terephthalate and polyethylene naphthalate are suitable film supports.

In general, such elements, emulsions, and layer compositions are described in many publications, including *Research Disclosure,* publication 36544, September 1994. *Research Disclosure* is a publication of Kenneth Mason Publications, Ltd., Dudley House, 12 North Street, Emsworth, Hampshire PO10 7DQ England.

The support can take the form of any conventional element support. Useful supports can be chosen from among those described in *Research Disclosure,* September 1996, Item 38957 XV. Supports and Research Disclosure, Vol. 184, August 1979, Item 18431, XII. Film Supports. They can be transparent or translucent polymeric film supports, or opaque cellulose papers or media. In its simplest possible form the film support consists of a material chosen to allow direct adhesion of the hydrophilic silver halide emulsion layers or other hydrophilic layers. More commonly, the support is itself hydrophobic and subbing layers are coated thereon to facilitate adhesion of the hydrophilic silver halide emulsion layers.

The photographic materials include one or more silver halide emulsion layers that comprise one or more types of silver halide grains responsive to suitable electromagnetic radiation. Such emulsions include silver halide grains composed of, for example, silver bromide, silver iodobromide, silver chlorobromide, silver iodochlorobromide, and silver chloroiodobromide, or any combinations thereof. The silver halide grains in each silver halide emulsion layer or unit can be the same or different, or mixtures of different types of grains.

The silver halide grains can have any desired morphology (for example, cubic, tabular, octahedral), or mixtures of grains of various morphologies. In some embodiments, at least 50% (sometimes at least 70%) of the silver halide grain projected area is provided by tabular grains having an average aspect ratio greater than 8, or greater than 12.

Imaging contrast can be raised by the incorporation of one or more contrast enhancing dopants. Rhodium, cadmium, lead and bismuth are all well known to increase contrast by restraining toe development. Rhodium is most commonly employed to increase contrast and is specifically preferred.

A variety of other dopants are known individually and in combination, to improve contrast as well as other common properties, such as speed and reciprocity characteristics. Dopants capable providing "shallow electron trapping" sites commonly referred to as SET dopants are specifically contemplated. SET dopants are described in *Research Disclosure,* Vol. 367, November 1994, Item 36736. Iridium dopants are very commonly employed to decrease reciprocity failure. A summary of conventional dopants to improve speed, reciprocity and other imaging characteristics is provided by Research Disclosure, Item 36544, cited above, Section I. Emulsion grains and their preparation, sub-section D. Grain modifying conditions and adjustments, paragraphs (3), (4) and (5).

Low COV emulsions can be selected from among those prepared by conventional batch double-jet precipitation techniques. A general summary of silver halide emulsions and their preparation is provided by *Research Disclosure,* Item 36544, cited above, Section I. Emulsion grains and their preparation. After precipitation and before chemical sensitization the emulsions can be washed by any convenient conventional technique using techniques disclosed by *Research Disclosure,* Item 36544, cited above, Section III. Emulsion washing.

The emulsions can be chemically sensitized by any convenient conventional technique as illustrated by *Research Disclosure,* Item 36544, Section IV. Sulfur and gold sensitization is specifically contemplated.

Instability which increases minimum density in negative-type emulsion coatings (i.e., fog) can be protected against by incorporation of stabilizers, antifoggants, antikinking agents, latent image stabilizers and similar addenda in the emulsion and contiguous layers prior to coating. Such addenda are illustrated by *Research Disclosure,* Item 36544, Section VII and Item 18431, Section II.

The silver halide emulsion and other layers forming the layers on the support contain conventional hydrophilic colloid vehicles (peptizers and binders) that are typically gelatin or a gelatin derivative (identified herein as "gelatino-vehicles"). Conventional gelatino-vehicles and related layer features are disclosed in *Research Disclosure,* Item 36544, Section II. Vehicles, vehicle extenders, vehicle-like addenda and vehicle related addenda. The emulsions themselves can contain peptizers of the type set out in Section II noted above, paragraph A. Gelatin and hydrophilic colloid peptizers. The hydrophilic colloid peptizers are also useful as binders and hence are commonly present in much higher concentrations than required to perform the peptizing function alone. The gelatino-vehicle extends also to materials that are not themselves useful as peptizers. The preferred gelatino-vehicles include alkali-treated gelatin, acid-treated gelatin or gelatin derivatives (such as acetylated gelatin and phthalated gelatin). Depending upon the use of the materials, the binder-containing layers can be hardened or unhardened.

Some photographic materials can include a surface overcoat on each side of the support that are typically provided for physical protection of the emulsion layers. In addition to vehicle features discussed above the overcoats can contain various addenda to modify the physical properties of the overcoats. Such addenda are illustrated by *Research Disclosure,* Item 36544, Section IX. Coating physical property modifying addenda, A. Coating aids, B. Plasticizers and lubricants, C. Antistats, and D. Matting agents. Interlayers that are typically thin hydrophilic colloid layers can be used to provide a separation between the emulsion layers and the surface overcoats. It is quite common to locate some emulsion compatible types of surface overcoat addenda, such as anti-matte particles, in the interlayers.

Processing the black and white element generally involves the steps of developing, fixing, washing, and drying. Processing can be carried out in any suitable processor or processing container for a given type of photographic element (for example, sheets, strips or rolls). The photographic material is generally bathed in the processing compositions for a suitable period of time.

The photographic developing composition includes at least one of the conventional developing agents utilized in black-and-white processing. Such developing agents include dihydroxybenzene developing agents, ascorbic acid developing agents, aminophenol developing agents, and 3-pyrazolidone developing agents. The dihydroxybenzene developing agents which can be employed in the developing compositions are well known and widely used in photographic processing. The preferred developing agent of this class is hydroquinone. Other useful dihydroxybenzenedeveloping agents include: chlorohydroquinone, bromohydroquinone, isopropylhydroquinone, toluhydroquinone, methylhydroquinone, 2,3-dichlorohydroquinone, 2,5-dimethylhydroquinone, 2,3-dibromohydroquinone, 1,4-dihydroxy-2-acetophenone-2,4-dimethylhydroquino ne 2,5-diethylhydroquinone, 2,5-di-p-phenethylhydroquinone, 2,5-dibenzoylaminohydroquinone, and 2,5-diacetaminohydroquinone. Ascorbic acid developing agents have also been utilized heretofore in a wide variety of photographic developing processes as shown in U.S. Pat. Nos. 2,688,548; 2,688,549; 3,022,168; 3,512,981; 3,870,479; 3,942,985; 4,168,977; 4,478,928; and 4,650,746. Developing compositions which utilize a primary developing agent, such as a dihydroxybenzene developing agent or an ascorbic acid developing agent, frequently also contain an auxiliary super-additive developing agent. Examples of useful auxiliary super-additive developing agents are aminophenols and 3-pyrazolidones. The auxiliary super-additive developing agents which can be employed in the developing compositions of are well-known and widely used in photographic processing.

In addition to one or more developing agents, the developing compositions usually also contain a sulfite preservative. By the term “sulfite preservative” as used herein is meant any sulfur compound that is capable of forming sulfite ions in aqueous alkaline solution. Examples of such compounds include alkali metal sulfites, alkali metal bisulfites, alkali metal metabisulfites, sulfurous acid and carbonyl-bisulfite adducts. Examples of preferred sulfites for use in the developing solutions of this invention include sodium sulfite, potassium sulfite, lithium sulfite, sodium bisulfite, potassium bisulfite, lithium bisulfite, sodium metabisulfite, potassium metabisulfite, and lithium metabisulfite. The carbonyl-bisulfite adducts are well-known compounds. Adducts of adehydes and adducts of ketones are useful and the adlehydes employed can be monoaldehydes, dialdehydes or trialdehydes and the ketones can be monoketones, diketones or triketones. The bisulfite adducts can be adducts of alkali metal bisulfites, alkaline earth metal bisulfites or nitrogen-base bisulfites such as amine bisulfites. Illustrative examples of the many carbonyl-bisulfite adducts which are useful in the present invention include the following compounds (all of those listed being sodium bisulfite adducts for the purpose of convenience in illustrating the invention, but it being understood that the compounds can also be employed in the form of adducts of other suitable bisulfites as explained herein-above): sodium formaldehyde bisulfite sodium acetaldehyde bisulfite sodium propionaldehyde bisulfite sodium butyraldehyde bisulfite succinaldehyde bis-sodium bisulfite glutaraldehyde bis-sodium bisulfite beta-methyl glutaraldehyde bis-sodium bisulfite maleic dialdehyde bis-sodium bisulfite sodium acetone bisulfite sodium butanone bisulfite sodium pentanone bisulfite 2,4-pentandione bis-sodium bisulfite, and the like. Alkaline agents whose functions is to control pH, such as carbonates, phosphates, amines or borates, are preferably also included in the developing compositions. The amount of primary developing agent incorporated in the working strength developing solution can vary widely as desired. Typically, amounts of from about 0.05 to about 1.0 moles per liter are useful. Typically, amounts in the range of from 0.1 to 0.5 moles per liter are employed. The amount of auxiliary super-additive developing agent utilized in the working strength developing solution can vary widely as desired. Usually, amounts of from about 0.001 to about 0.1 moles per liter are useful. Typically, amounts in the range of from 0.002 to 0.01 moles per liter are employed. The amount of sulfite preservative utilized in the working strength developing solution can vary widely as desired. Typically, amounts of from about 0.05 to about 1.0 moles per liter are useful. Amounts in the range of from 0.1 to 0.5 moles per liter are commonly employed. Working strength developing solutions prepared from the developing compositions of this invention typically have a pH in the range of from 8 to 13 and preferably in the range of from 9 to 11.5. Typically, the development temperature can be any temperature within a wide range as known by one skilled in the art, for example from about 15 to about 50° C.

A variety of other optional ingredients can also be advantageously included in the developing composition. For example, the developing composition can contain one or more antifoggants, antioxidants, sequestering agents, stabilizing agents or contrast-promoting agents. Examples of particularly useful contrast-promoting agents are amino compounds as described, for example, in U.S. Pat. No. 4,269,929. Examples of useful stabilizing agents are β-ketocarboxylic acids as described, for example, in U.S. Pat. No. 4,756,997.

In most processing methods, the developing step is generally followed by a fixing step using a photographic fixing composition containing a photographic fixing agent. While sulfite ion sometimes acts as a fixing agent, the fixing agents generally used are organic compounds such as thiosulfates (including sodium thiosulfate, ammonium thiosulfate, potassium thiosulfate and others readily known in the art), thiocyanates (such as sodium thiocyanate, potassium thiocyanate, ammonium thiocyanate, amines, halides and others readily known in the art (such as those described by Haist, *Modern Photographic Processing,* John Wiley & Sons, N.Y., 1979). Mixtures of one or more of these classes of photographic fixing agents can be used if desired. Thiosulfates and thiocyanates are preferred. In some embodiments, a mixture of a thiocyanate (such as sodium thiocyanate) and a thiosulfate (such as sodium thiosulfate) is used. In such mixtures, the molar ratio of a thiosulfate to a thiocyanate is from about 1:1 to about 1:10, and preferably from about 1:1 to about 1:2. The sodium salts of the fixing agents are preferred for environmental advantages.

The fixing composition can also include various addenda commonly employed therein, such as buffers, fixing accelerators, sequestering agents, swelling control agents, and stabilizing agents, each in conventional amounts. In its aqueous form, the fixing composition generally has a pH of at least 4, preferably at least 4.5, and generally less than 6, and preferably less than 5.5.

In processing black-and-white photographic materials, development and fixing are preferably, but not essentially, followed by a suitable washing step to remove silver salts dissolved by fixing and excess fixing agents, and to reduce swelling in the element. The wash solution can be water, but preferably the wash solution is acidic, and more preferably, the pH is 7 or less, and preferably from about 4.5 to about 7, as provided by a suitable chemical acid or buffer.

After washing, the processed elements may be dried for suitable times and temperatures, but in some instances the black-and-white images may be viewed in a wet condition.

Exposure and processing can be undertaken in any convenient conventional manner. Some exposure and processing techniques are described in U.S. Pat. Nos. 5,021,327; 5,576,156; 5,738,979, 5,866,309, 5,871,890, 5,935,770, and 5,942,378. Such processing can be carried out in any suitable processing equipment The final step in forming the image is to scan the image resulting form development processing and using an image enhancement algorithm to arrive at the final image. Conventional scanning techniques can be employed, including point-by-point, line-by-line and area scanning, and require no detailed description. A simple technique for scanning is to scan the photographically processed element point-by-point along a series of laterally offset parallel scan paths. The intensity of light received from or passing through the photographic element at a scanning point is noted by a sensor which converts radiation received into an electrical signal. The electrical signal is processed and sent to memory in a digital computer together with locant information required for pixel location within the image.

A convenient form of scanner can consist of a single multicolor image sensor or a single set of color sensors, with a light source placed on the opposite side of the film. Light transmitted through the film can give information on the image pattern in the emulsion layer(s) modulated by the color filter array.

Various methods of image processing may be employed. A relatively simple method is to represent the image data in a color model which has a luminance or lightness component and two chromatic or color components, such as the CIE L*a*b model. The chromatic components are then blurred with a suitable image filter to remove the higher frequency color information which arises largely from the color filter array, and the blurred chromatic information recombined with the original luminance information. The color saturation of the image may be varied by altering the contrast of the chromatic components. Other methods of image processing may be employed After image processing, the resulting representation of the scene recorded by the method of the invention may be viewed on a screen or printed by suitable means to give a printed photographic image.

The multilayered article of the invention is preferably prepared by coating and drying on the support the indicated layers in the desired sequence, as conventionally done in the manufacture of photographic film. Subbing layers and adhesive layers may be employed where appropriate.

In operation, the red portion of an image would be reproduced in the following manner using reversal processing and additive color beads of red, green, and blue, the formation of a red portion of the original would proceed as follows:

1. Red light is permitted to pass through a red bead 5 and create a latent image on the light sensitive layer 2 of the film.
2. The resulting latent image is reversal developed so that there is no silver beneath the red bead but there is silver beneath other red beads where there is no red in the original image.
3. A red laser is used to scan the film and is transmitted through the film only where there is a red bead and no silver below it (i.e. where there is a red image in the original) and information on the location of the relevant red color areas is saved.
4. Image enhancement software is then used to provide the finished reproduction.

The invention is further illustrated by the following examples.

SYNTHETIC EXAMPLE—LIMITED COALESENCE 7.2 g of 2,2'-azobis(isobutyronitrile) (sold as Vazo 64® by DuPont Corp.), is dissolved in 720 g of styrene monomer. In a separate flask is added 870 g of demineralized water to which is added 0.25 g potassium dichromate, 2.83 g of poly(2-methylaminoethanol adipate), and 84 g of Ludox HS-40®, a 40% colloidal suspension of silica sold by DuPont Corp. The pH of the aqueous phase is adjusted to 4.0 to 4.3 using dilute hydrochloric acid. The monomer is added to the aqueous phase and stirred to form a crude emulsion. This is passed through Gaulin colloid mill operated at 4.54 l/minute feed rate, 3,900 rev/min and gap setting of 0.0254 cm. The mixture is heated to 60° C. for 16 hours followed by heating to 80° C. for 4 hours. The resulting slurry of solid polystyrene beads are sieved through a 200 mesh sieve screen to remove oversized beads and the desired beads which pass through the screen are collected by filtration and washed with demineralized water.

IMAGING EXAMPLES

Example 1

This example illustrates the construction of a silver halide emulsion based color filter array (CFA) film with a CFA comprising red, blue and green colored micro-spheres (beads) embedded in a water permeable layer containing carbon black.

Seventy five grams of a 47.6% w/w suspension of polystyrene beads prepared by limited coalescence (having mean diameter of 6 microns) was combined with 75 grams of distilled water and 15 grams of poly(vinyl alcohol) (75% hydrolyzed, molecular weight 2000) to constitute a diluted latex suspension. The "Limited Coalescence" process is described in J. Colloid Interface Sci. vol. 169, p. 48 (1995) as exemplified in the preceding example.

A suspension of red colored beads was prepared by first dissolving 0.5 grams of Dye 1, 0.5 grams of Neptun Yellow 075 from BASF Corporation, an organic soluble azo dye with a spectral absorption maximum of 450 nm, in tolune and 0.225 grams of Sudan Orange 220 from BASF Corporation an organic soluble azo dye with a spectral absorption maximum of 474 nm in toluene in 0.5 grams of toluene and 49.5 grams of acetone. Fifty five grams of the diluted latex suspension was then added slowly (drop-wise) to this solution of the dyes while stirring to prepare a dyed latex suspension. The dyed latex suspension was then filtered using a porous cotton filter, poured into a dialysis bag (12,000 to 14,000 molecular weight cutoff) and washed with distilled water for one hour. After washing, the dyed latex suspension was filtered again using a porous cotton filter. The washed and filtered dyed latex suspension was centrifuged to provide a concentrated aqueous suspension of red colored polymer beads suitable for coating (15% w/w beads).

A suspension of blue colored beads was prepared by dissolving 0.7 grams of Dye 2 and 0.55 grams of Dye 3 in 0.5 grams of toluene and 49.5 grams of acetone. The remainder of the preparation was similar to that of the red colored beads described above.

A suspension of green colored beads was prepared by dissolving 0.45 grams of Dye 3 and 0.495 grams of Neptun Yellow 075 0.5 grams of toluene and 49.5 grams of acetone. The remainder of the preparation was similar to that of the red colored beads described above.

Spectral analysis of the light transmission properties of the three colors of beads showed that each color of beads was sufficient to transmit light primarily in the desired color range.

A CFA scan film comprising the above colored particles was prepared as follows:

The following black and white emulsion layers were first coated on a cellulose triacetate film support having a carbon anti-halation backing (coverages are in grams per meter squared, emulsion sizes as determined by the disc centrifuge method are reported in diameter×thickness in micrometers). Surfactants, coating aids and emulsion addenda were added as is common in the art.

Layer 1 (slow layer): a blend of three dyed (all with mixtures of SD-1 and SD-2) tabular silver iodobromide emulsions: (i) 1.30×0.12, 4.1 mole % I at 0.80 (ii) 0.66×0.12, 4. mole % I at 1.20 (iii) 0.55×0.08, 1.5 mole % I at 1.20; CHEM-1 at 1.50; and gelatin at 4.10.

Layer 2 (fast layer): a dyed (with a mixture of SD-1 and SD-2) tabular silver iodobromide emulsion 2.61×0.12, 3.7 mole % I at 1.40; CHEM-1 at 0.70; and gelatin at 1.80.

A sublayer or undercoat layer containing 1.08 g/m$^2$ of acid processed ossein gelatin was coated above the emulsion layers. The suspensions of colored beads were combined with lime processed ossein gelatin and an aqueous nano-particulate dispersion of carbon black obtained by milling commercially available carbon black Black Pearls 880 from Cabot Corp. to a mean size below 100 nm using a conventional media mill with 50 micron polymeric beads and spread over the above emulsion layers to provide a CFA film with CFA layer containing 2.9 g/m$^2$ beads (equal parts of red, green, and blue colored beads), 0.43 g/m$^2$ carbon black and 0.52 g/m$^2$ gelatin. An overcoat containing 1.08 g/m$^2$ gelatin was coated above the CFA layer.

It is important that the diameter of the beads should be greater than or equal to the thickness of the binder between the beads in the layer. A surface view of the film via photomicrography showed that about 60% of the surface was covered and that the covered surface was primarily a monolayer of the beads arranged in a random manner. It is clear that CFA layers containing these high density micro-scale filters can be successfully coated over light sensitive silver halide emulsion layers by this method.

The above film was exposed under varying light conditions using a Minolta XG7 SLR camera. The film was then Black and White processed at 34.8° C. using developer of the following composition.

| | |
|---|---|
| Sodium carbonate | 25.1 g/L |
| Sodium sulfate | 5.0 g/L |
| Glycine | 25.1 g/L |
| MOP(4-hydroxymethyl-4methyl-1-phenyl-3pyrazolidinone) | 1.5 g/L |
| Sodium bromide | 1.0 g/L |

The exposed film was immersed in the developer for one minute followed by one minute in a 3% acetic acid stop bath, washed in running water for three minutes, and then immersed for five minutes in a C-41 fixer followed by a final wash for five minutes.

The processed negatives were scanned using a Kodak RFS3750 film scanner and then electronically color enhanced using Adobe Photoshop software version 5.0. Good quality prints were then obtained from the color enhanced images using a Kodak Professional 8670 PS thermal printer.

Dye 1

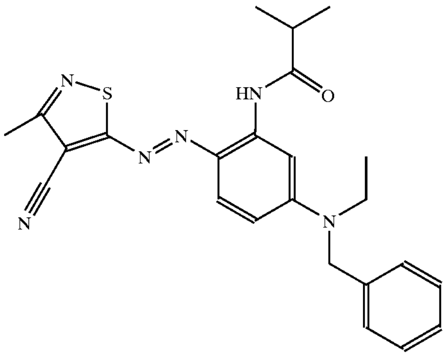

-continued

Dye 2

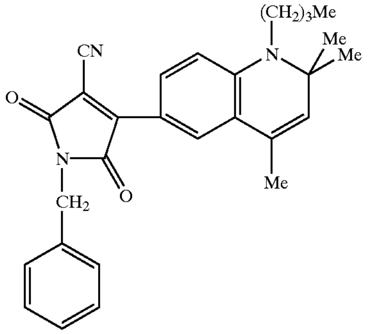

Dye 3

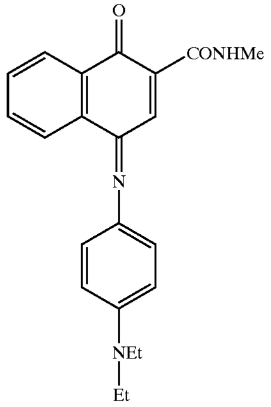

SD-1

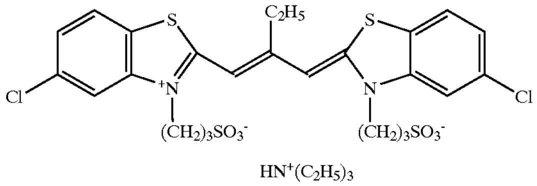

SD-2

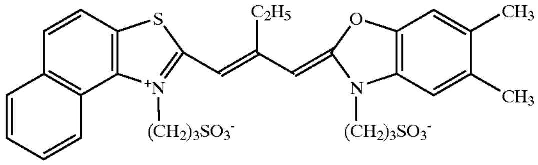

CHEM-1

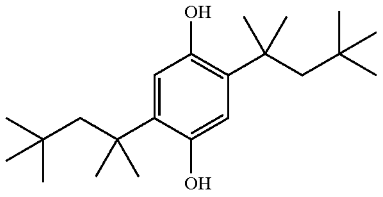

Example 2

This example further illustrates the construction of a silver halide based color filter array (CFA) film with a CFA comprising red and green colored micro-spheres (beads) embedded in a clear gelatin layer.

In an effort to narrow the size distribution of the beads, 1.1 L of a 47.6% w/w suspension of polystyrene beads prepared by limited coalescence (having mean diameter of 6 microns) was poured into a 2L graduated cylinder and allowed to settle under gravity. For particles of a given density settling in a medium of a certain viscosity the rate of settling is dependent on particle size. Larger particles settle at a faster rate compared to smaller particles. The property may be used to separate the larger particles from the smaller ones in a suspension containing a mixture of sizes. Sedimentation can be conducted in stages in order to achieve successively better separation. The suspension was allowed to settle for 48 h. At the end of this time two layers were easily observed. 200mL of suspension was removed from the top of the bottom layer and placed in a 250 mL graduated cylinder. After four days, the suspension had further segregated into three distinct layers. The topmost (clear) layer was discarded and the middle layer was collected for further use. The concentration of beads in this layer was 19.61% w/w. Twenty grams of this was combined with 4 grams of poly(vinyl alcohol) (75% hydrolyzed, molecular weight 2000) to constitute a diluted latex suspension.

A suspension of red colored beads was prepared by first dissolving 0.084 grams of Dye 1, 0.084 grams of BASF Neptun Yellow 075, and 0.038 grams of Dye Sudan Orange 220 in 0.2 grams of toluene and 9.8 grams of acetone. Twenty two grams of the above diluted latex suspension was then added slowly (drop-wise) to this solution of the dyes while stirring to prepare a dyed latex suspension. The dyed latex suspension was then filtered using a porous cotton filter, poured into a dialysis bag (12,000 to 14,000 molecular weight cutoff) and washed with distilled water for one hour. After washing, the dyed latex suspension was filtered again using a porous cotton filter. The concentration of beads in the suspension after washing was 8.12% w/w.

A suspension of green colored beads was prepared by dissolving 0.074 grams of Dye 3 and 0.081 grams of Neptun Yellow 075 in 0.2 grams of toluene and 9.8 grams of acetone. The remainder of the preparation was similar to that of the red colored beads described above. The concentration of green beads in the suspension after washing was 8.66% w/w.

The suspensions of colored beads were combined with gelatin and spread over layers as in Example 1 containing panchromatically sensitized silver halide emulsion to provide a CFA film with CFA layer containing 1.5 g/m$^2$ beads (0.75 g/m$^2$ red colored beads and 0.75 g/m$^2$ green colored beads) and 0.52 g/m$^2$ gelatin. A photomicrograph of a cross-section of the coating showed that the majority of the beads constitute a mono-layer in cross-section with very little overlap. The percentage overlap, defined as (number of overlapping beads in cross-section/total number of beads in cross-section)×100 is typically less than 20% using this method, which is necessary for accurate color reproduction. Furthermore, such a CFA is realized without the application of heat or pressure which is damaging to a configuration where the emulsion layer is already in place when the heat and pressure are applied.

The film was exposed, processed and scanned and image processed in a manner similar to that described under Example 1. Once again good quality color prints were obtained from the electronically enhanced images.

Example 3

This example illustrates the effect of the amount of cross-linker in the polymer beads on the efficiency of dye loading.

Five grams of a 16% suspension of polystyrene beads based on 100% styrene monomer was combined with 5 grams of distilled water and 0.08 grams of poly(vinyl alcohol) (75% hydrolyzed, molecular weight 2000) to constitute a diluted latex suspension.

A suspension of blue colored particles was prepared by first dissolving 0.07 grams of Dye 2 and 0.055 grams of Dye 3 in 0.05 grams of toluene and 4.95 grams of acetone. 5.08 grams of the diluted latex suspension was then added slowly (drop-wise) to this solution of the dyes while stirring to prepare a dyed latex suspension. The dyed latex suspension was then filtered using a porous cotton filter, poured into a dialysis bag (12,000 to 14,000 molecular weight cutoff) and washed with distilled water for one hour. After washing, the dyed latex suspension was filtered again using a porous cotton filter.

The above procedure was repeated using suspensions of latex beads based on 95% by weight styrene, 5% by weight di-vinyl benzene (cross-linker) and 70% by weight styrene, 30% by weight di-vinyl benzene respectively.

Inspection of the samples by optical microscopy showed that intensely colored beads were obtained in the first two cases; i.e. with no cross-linker and also with 5% cross-linker; however, in the last case (30% cross-linker) the beads were almost colorless, suggesting that an excess of cross-linking agent results in almost no dye uptake by the particles.

Example 4

This example illustrates the undesirable effect of pressure on sensitometry of the CFA scan film.

Red and green colored beads were prepared in a manner similar to that described in Example 1. The beads were mixed with gelatin and coating aids and coated over emulsion layers as described in Example 1 to provide a CPA film with CPA layer containing 1.5 g/m$^2$ beads (0.75 g/m$^2$ red colored beads and 0.75 g/m$^2$ green colored beads) and 0.52 g/m$^2$ gelatin. The film was cut into 35 mm strips and two of the strips were used in the following experiment.

One strip was subjected to a pressure of 4 kg/cm$^2$ at 120° C. for 280 milliseconds by passing it through a pair of heated rollers and the other strip was used as control. Both strips were then exposed to a 5500° K. light source with 0.9ND (neutral density) filter for 1/100s through a 21 step 0–3 tablet. The strips were then processed using the processing sequence described in Example 1. Visual density at each step was measured using an X-Rite 820 densitometer. Significant undesirable changes in sensitometry were observed as a result of the application of pressure. For example, the control strip had a minimum density (Dmin) of 0.31±0.01 whereas the strip subjected to heat and pressure had a Dmin of 0.37±0.01.

The entire contents of the patents and other publications referred to in this specification and in the identified Research Disclosure publications are incorporated herein by reference.

| PARTS LIST | |
|---|---|
| 1. | Support |
| 2. | Light Sensitive Layer |
| 3. | Under Layer |
| 4. | Color Filter Array (CFA) Layer |
| 5. | Protective Overcoat |
| 6. | Transparent Bead of First Color |
| 7. | Transparent Bead of Second Color |

-continued

| PARTS LIST | |
|---|---|
| 8. | Transparent Bead of third Color |
| 9. | Water permeable Continuous Phase Transparent Binder |
| 10. | Neutral Nano-Particle |

What is claimed is:

1. A process for forming a color filter array layer on a transparent surface, comprising the step of applying a water-borne solid-particle dispersion of randomly disposed colored beads of a water-immiscible synthetic polymer to the surface.

2. The process of claim 1 wherein the beads are colored prior to application by contacting an aqueous suspension of the beads with an organic soluble dye in a water miscible solvent for the dye.

3. The process of claim 1 in which a gelation material is added to the bead dispersion prior to contacting the water-borne solid-particle dispersion of the beads with the surface.

4. The process of claim 3 in which the water-borne solid-particle dispersion of the beads containing a gelation material gels prior to drying of the filter layer.

5. The process of claim 1 wherein said beads are composed of a polymer containing substantially no crosslinking.

6. The process of claim 1 wherein said beads are composed of a cross-linked polymer.

7. The process of claim 6 wherein the beads contain less than 30% cross linker.

8. The process of claim 1 in which the beads are formed by an emulsion polymerization or a limited coalescence process.

9. The process of claim 1 wherein the film is not exposed to a pressure of 2 $kg/cm^2$ or more.

10. The process of claim 1 wherein the surface is part of a photographic film comprising (1) a support and (2) a light sensitive layer.

11. The process of claim 10 wherein the dispersion is applied to a surface of a light sensitive film wherein the surface is farther from the support than the light sensitive layer, so that a significant compressive force cannot be applied to the surface during manufacture without causing damage to the light sensitive layer.

12. The process of claim 10 wherein the light-sensitive layer is a silver halide layer.

13. The process of claim 10 wherein the filter layer components are selected so that the filter layer is water-permeable.

14. The process of 10 wherein the dispersion is applied to a surface of a light sensitive film wherein the surface is farther from the light sensitive layer than the support.

15. The process of claim 1 wherein the beads have an average equivalent circular diameter of 3–15 micrometers.

16. The process of claim 1 wherein the dispersion additionally contains neutral nano-particles having an average particle size in the range of 0.01 to 0.3 microns.

17. The process of claim 1 wherein the average diameter of the beads is greater than or equal to the average space between the beads.

18. The process of claim 1 wherein the percentage overlap is less than 20%.

19. The process of claim 1 wherein the surface to which the beads are applied enhances uniformity of bead coating.

20. The process of claim 1 comprising the additional step of applying a protective overcoat to the CFA.

* * * * *